United States Patent [19]

Williams

[11] 4,103,597

[45] Aug. 1, 1978

[54] COOLING VENT ATTACHMENT FOR SIDE WINDOW OF AIRCRAFT

[76] Inventor: Rudolph Williams, 26 South Rd., Parkway Gardens Greenburgh, White Plains, N.Y. 10600

[21] Appl. No.: 770,996

[22] Filed: Feb. 22, 1977

Related U.S. Application Data

[63] Continuation of Ser. No. 650,299, Jan. 19, 1976, abandoned.

[51] Int. Cl.² .......................................... B60H 1/24
[52] U.S. Cl. ...................... 98/2.12; 98/2.13; 49/476
[58] Field of Search ............ 98/1, 1.5, 2, 2.11, 98/2.12, 2.13, 2.16, 2.17, 13, 18, 89, 25–27, 88 S, 88 R, 95–99 R, 99.7, 99.8; 49/476; 244/117 A; 160/13, 15, 44, 181, 182, DIG. 2; 296/84 M

[56] References Cited

U.S. PATENT DOCUMENTS

| 1,109,793 | 9/1914 | Scott | 98/98 |
| 1,716,324 | 6/1929 | Robichund | 98/97 |
| 2,749,830 | 6/1956 | George | 98/2.13 |
| 2,841,069 | 7/1958 | Ginzburg | 98/2.13 |
| 3,083,048 | 3/1963 | Kramer | 49/476 |
| 3,733,996 | 5/1973 | Naccarato et al. | 98/2.12 |

FOREIGN PATENT DOCUMENTS

| 1,023,323 | 3/1953 | France | 98/2 |
| 887,466 | 8/1953 | Fed. Rep. of Germany | 98/2 |

*Primary Examiner*—William F. O'Dea
*Assistant Examiner*—Henry C. Yuen

[57] ABSTRACT

A detachable cooling vent assembly installed in the side window of a parked aircraft enables ventilation of the interior while barring entry of rain and insects. The cooler interior temperature resulting from ventilation through the cooling vent reduces heat-caused deterioration of cabin electronic equipment, fabrics, and fittings.

1 Claim, 3 Drawing Figures

COOLING VENT ATTACHMENT FOR SIDE WINDOW OF AIRCRAFT

This is a continuation of application Ser. No. 650,299, filed Jan. 19, 1976 now abandoned.

BACKGROUND OF THE INVENTION

Private and general aviation aircraft are often stored for long periods in outdoor "tie-down" locations unprotected from rain or sun. When exposed to solar radiation, the aircraft temperature reaches equilibrium according to the following equation when second-order terms are omitted:

$$Q_s = K_c(T - T_A)$$

Where:
$Q_s$ = solar heat load, known as insolation
$K_c$ = convection transfer coefficient (varies non-linearly with wind speed)
$T$ = aircraft skin temperature
$T_A$ = air temperature When the wind velocity is low and the insolation unobscured by atmospheric water vapor, the aircraft temperature, T, must rise to very high values to balance the heat load, $Q_s$. Aircraft interior temperatures of 150° to 180° Fahrenheit (66.6° to 83.3° C.) and higher are not uncommon in summer.

High interior temperatures cause outgassing of plasticisers in flexible plastic upholstery, rendering them brittle; drying of adhesives, allowing them to lose adhesion; and premature aging of electronic components, resulting in early failure. The result of these effects is increased cost of equipment repair and replacement, and early degradation in interior appearance.

The prior art fails to disclose a removable vent assembly to enable ventilation of a vehicle interior. The disclosure in U.S. Pat. No. 3,839,950 in the name of Kelly et al shows a plate having vent openings firmly fixed within a building opening and closed by a guided closing member. U.S. Pat. No. 3,513,764 in the name of H. Stober shows a fixed vent system in the door of a bus. None of the disclosed inventions are appropriate to satisfy the need for a removable vent attachment for use in parked aircraft.

SUMMARY OF THE INVENTION

The present invention provides a detachable cooling vent which is installed in the side window of an aircraft in preparation for long-term outdoor parking. Holes in the ventilator allow the entry of cooling air into the aircraft cabin while screening bars the entry of insects. Water runoff from the aircraft skin is diverted by a rain gutter to keep it from entering the aircraft cabin.

It is an object of this invention to provide ventilation to the interior of a parked aircraft.

It is a further object of this invention to prevent the entry of insects into the interior of an aircraft through ventilation openings.

It is a further object of this invention to divert water from entry into the aircraft.

It is a further object of this invention to reduce the deleterious effect of heat on the equipment and fittings in the cabin of parked aircraft.

DESCRIPTION OF THE DRAWINGS

The detailed description of the preferred embodiment of the invention can best be understood when read with reference to the drawings in which.

DETAILED DISCLOSURE OF THE INVENTION

Figure 1:
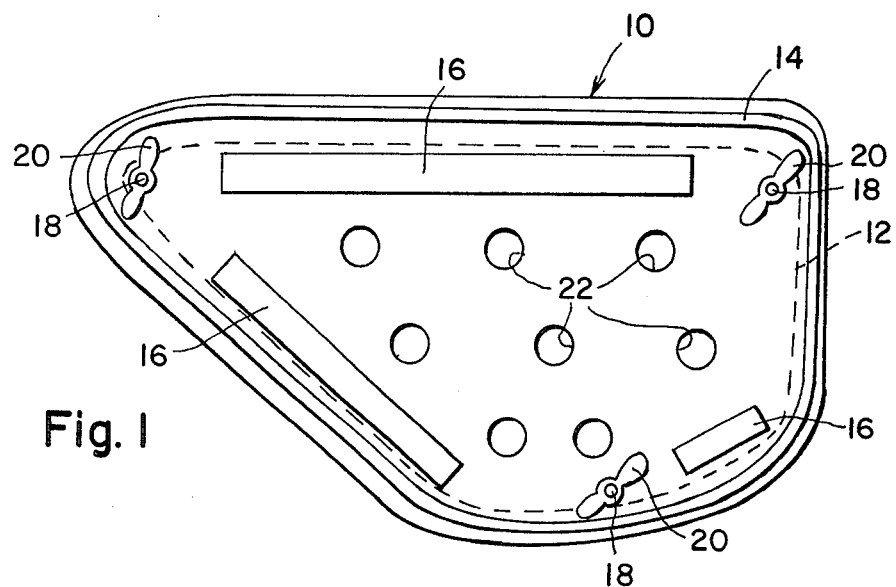
FIG. 1 is an inside view.

Referring specifically to FIG. 1 there is shown a vent attachment shown generally at 10. The vent attachment 10 is constructed of any convenient material in a size and shape such that it extends beyond the window opening 12 and overlaps the window of the aircraft for which it is constructed. It will be understood that different shapes and sizes are required for different aircraft. A resilient gasket 14 suitable for compressible engagement with the aircraft skin surrounding the aircraft window is cemented inside the perimeter of the vent attachment. A plurality of rigid frame blocks 16 are attached to the inside surface of the vent attachment 10 such that the blocks fit within the perimeter of the aircraft window 12, forming an inner frame to hold the vent attachment 10 in correct lateral position. Threaded posts 18 suitable for engagement with wing nuts 20 extend inward from positions in the vent attachment 10 between the support blocks. The face of the vent attachment 10 is shown pierced with a plurality of ventilating holes 22 to allow entry of air.

Figure 2:
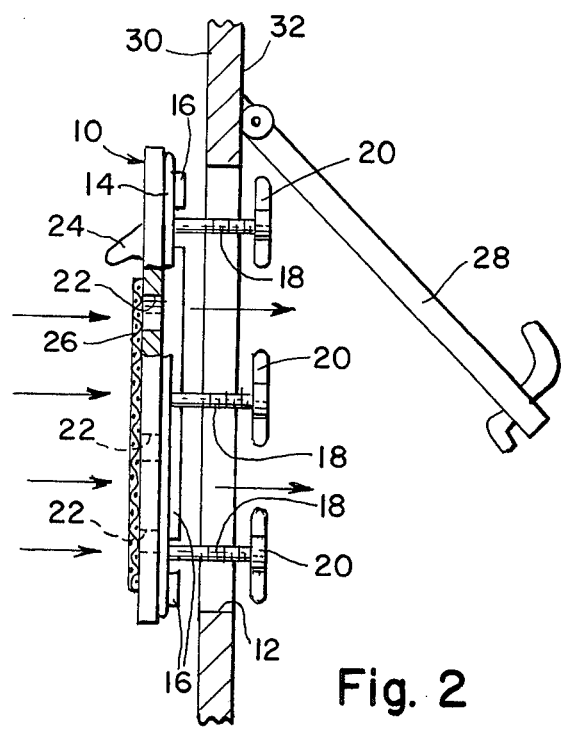
FIG. 2 is an edge cross section.

Referring now to FIG. 2, there is shown a rain gutter 24 on the top of the outside of the vent attachment 10 and insect screening 26 covering the area which is pierced by ventilating holes 22.

When the vent attachment 10 is to be installed, the aircraft window 28 is opened and secured in the open position. The wing nuts 20 are either removed or turned so that they do not interfere with insertion into the window opening 12. The vent attachment 10 is brought up to the window opening 12 such that the threaded posts 18 pass grazingly through the window opening. The frame blocks 16 pass within the window frame 12. The resilient gasket 14 is compressibly engaged with the outer surface 30 of the window frame. The plurality of wing nuts 20 are tightened against the inside surface 32 of the window frame sufficiently to compress the resilient gasket 14 and thereby create a weather-tight seal around the perimeter of the vent attachment 10.

Figure 3:
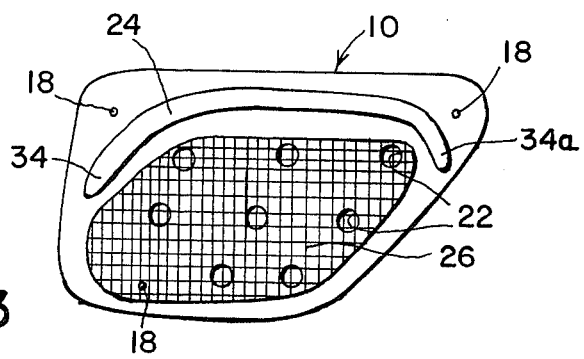
FIG. 3 is an outside view.

In FIG. 3 is shown an outside view of the vent attachment 10 wherein can be seen the rain gutter 24 extending across the top of the vent attachment. Bent ends 34, 34a direct rainwater down and away from the portion containing vent holes 22.

Before flight the vent attachment 10 is removed by removing or turning the wing nuts 20 such that they do not interfere with the window frame 12 and lifting the vent attachment 10 from the aircraft. The aircraft window 28 is thus returned to its normal function.

What is claimed is:

1. A removeable vent for aircraft having at least one hinged window in a window opening between the outer skin and the interior wall of the aircraft comprising:
   (a) a panel substantially similar in shape to said window opening;
   (b) said panel being substantially larger than said window opening;

(c) the entire perimeter of said panel overlapping the outer skin of the aircraft outside said window opening;

(d) a resilient gasket on the overlap area of said entire perimeter whereby a waterproof seal between said panel and the outer skin of the aircraft is achieved;

(e) a plurality of rigid frame blocks on the inside of said panel, said frame blocks being positioned to partially enter said window opening and laterally position said panel centered on said window opening;

(f) ventilating holes in said panel;

(g) insect screening on said panel at least over said ventilating holes;

(h) at least two spaced-apart threaded posts extending inward normal to said panel;

(i) said at least two spaced-apart threaded posts passing grazingly through said window opening into the interior of the aircraft;

(j) wing nuts threaded onto each of said at least two threaded posts;

(k) the wings of said wing nuts engaging the interior wall adjacent to said window opening and applying inward force on said at least two threaded posts whereby said resilient gasket is compressed between said panel and said outer skin; and (l) a rain gutter across the top of said panel at least over the area of said panel containing said ventilating holes, said rain gutter directing rainwater downward and away from said ventilating holes.

* * * * *